UNITED STATES PATENT OFFICE.

JOHN A. JUST, OF SYRACUSE, NEW YORK, ASSIGNOR OF ONE-HALF TO D. H. BURRELL & COMPANY, OF LITTLEFALLS, NEW YORK, A FIRM.

BAKING-POWDER.

SPECIFICATION forming part of Letters Patent No. 692,453, dated February 4, 1902.

Application filed July 5, 1901. Serial No. 67,166. (No specimens.)

*To all whom it may concern:*

Be it known that I, JOHN A. JUST, a citizen of the United States, and a resident of Syracuse, in the county of Onondaga and State of New York, have invented a new and useful Improvement in Baking-Powders, of which the following is a specification.

In baking-powders the acid ingredient and the alkaline carbonate or gas-producing ingredient are rarely present in their exact equivalent proportions. Baking-powders are usually mixed in large quantities, and the ingredients of which they are composed are usually commercial ingredients, which differ more or less in quality at different times. Furthermore, it is difficult to weigh out these ingredients in large quantities in exact amounts which are necessary to produce the desired mixture. For these reasons, even with careful supervision of the manufacture, it is almost invariably the case that one of the ingredients, usually the alkaline ingredient, is present in excess. When the baking-powder contains an excess of the alkaline ingredient, which is extremely undesirable, the baking will contain free alkali, which injures the taste and darkens the color of the baking. If the acid ingredient in the baking-powder is present in excess, the baking contains free acid, which injures the taste.

The object of this invention is to overcome these difficulties in a simple, certain, and inexpensive manner and without introducing an objectionable ingredient into the baking-powder.

I have discovered that casein has a dual capacity of neutralizing an excess either of the acid or the alkaline ingredient, and I avoid the above-mentioned difficulties by adding to the baking-powder a sufficient amount of casein to take up any excess of acid or alkali which is liable to be present in the residue resulting from the baking-powder in the baking. The casein can be employed either as casein or as a caseinate or compound of casein and an alkali or an alkaline earth.

In practicing my invention I prefer to employ a caseinate made from a solution which is neutral to phenolphthalein. I prepare such a caseinate by dissolving a well-washed cheese-curd in an alkali, preferably soda, using only sufficient alkali to saturate about two-thirds of the total natural acidity of the curd. This solution will be neutral to phenolphthalein. The solution is then dried, preferably upon a steam-heated cylinder, and reduced to a fine powder by rubbing through a sieve or otherwise. The caseinate so produced still reacts acid to blue litmus, but is capable of taking up an excess of alkali or an excess of the acid ingredient, as the case may be. An excess of the alkaline ingredient in the baking-powder will form, with the acid caseinate, a salt and advance its point of saturation equivalent to the excess of alkaline salt which is present in the baking-powder. An excess of the acid ingredient in the baking-powder will be neutralized by the alkali, which is weakly bound to casein and readily replaceable by an acid-reacting substance. Thus the casein or caseinate is ready to neutralize an excess of either the alkaline or the acid ingredient, rendering the residue of the baking-powder neutral in every case and avoiding the objectionable effects upon the baking which result from an excess of either ingredient. Casein can be used instead of a caseinate, and a caseinate can be used which is made from a solution not neutral to phenolphthalein; but a caseinate made from a solution which is neutral to phenolphthalein is to be preferred, as it acts much more satisfactorily in effecting the desired neutralization.

The percentage of free sodium bicarbonate in standard baking-powders ranges up to two per cent. and sometimes reaches three per cent. through neglect or accident. In order to neutralize any excess of the alkaline ingredient which is liable to be present in practice, the caseinate should be employed in such proportion that the amount is sufficient to neutralize about 3.5 per cent. of the alkaline ingredient. For illustration, to a baking-powder composed, by weight, of cream of tartar, fifty-one parts, sodium bicarbonate, twenty-three parts, and starch, eighteen parts, the amount of caseinate added thereto should be about seven parts. This amount of caseinate is also more than sufficient to take care of any free acid which is liable to be present, if the acid ingredient should be present in excess.

The casein or caseinate is a desirable addition to the baking-powder, as it is entirely unobjectionable in the baking when uncombined, produces no undesirable residues when combined with the acid or alkaline ingredient, adds to the food value of the baking, and does not affect the color or taste thereof.

I claim as my invention—

A baking-powder containing an acid ingredient, an alkaline carbonate, and casein substantially free from milk-sugar, salts and other ingredients of milk, in sufficient proportion to practically neutralize an excess of the alkaline ingredient or of the acid ingredient, substantially as set forth.

Witness my hand this 2d day of July, 1901.

JOHN A. JUST.

Witnesses:
  LOOMIS BURRELL,
  F. A. TINKER.